US010304048B2

(12) United States Patent
Runyan et al.

(10) Patent No.: US 10,304,048 B2
(45) Date of Patent: May 28, 2019

(54) LIMITED USE AUTHENTICATION ON DETECTION OF NON-OPERATIONAL DEVICE

(71) Applicant: PAYPAL, INC., San Jose, CA (US)

(72) Inventors: Billy Henry Runyan, Austin, TX (US); Marty Jorgensen, Mountain View, CA (US); Mohammad Zunaid Siddique, Round Rock, TX (US); Rahul Nair, Austin, TX (US); Eduardo Batlle, Austin, TX (US); Michael Benjamin Bowman, Austin, TX (US); Rashmi Singh Prakash, Austin, TX (US)

(73) Assignee: PAYPAL, INC., San Jose, CA (US)

( * ) Notice: Subject to any disclaimer, the term of this patent is extended or adjusted under 35 U.S.C. 154(b) by 590 days.

(21) Appl. No.: 14/755,467

(22) Filed: Jun. 30, 2015

(65) Prior Publication Data

US 2017/0004483 A1    Jan. 5, 2017

(51) Int. Cl.
*G06Q 20/40* (2012.01)
*G06Q 20/32* (2012.01)
*G06Q 20/36* (2012.01)

(52) U.S. Cl.
CPC ....... *G06Q 20/325* (2013.01); *G06Q 20/3674* (2013.01); *G06Q 20/401* (2013.01); *G06Q 2220/00* (2013.01)

(58) Field of Classification Search
CPC .................................................. G06Q 20/385
USPC .......................................................... 705/67
See application file for complete search history.

(56) References Cited

U.S. PATENT DOCUMENTS

2007/0287438 A1*  12/2007  Hansen ................... H04M 3/54
                                                                       455/417
2014/0330656 A1*  11/2014  Zhou ..................... G06Q 20/322
                                                                        705/16

* cited by examiner

*Primary Examiner* — Cho Kwong
(74) *Attorney, Agent, or Firm* — Haynes and Boone, LLP

(57) ABSTRACT

There are provided systems and methods for authentication depending on device capabilities and user requests based on situational information collected in advance of a device becoming non-operational. A user may wish to utilize some device process, such as access and use of a device application or other module. For example, a user may wish to utilize a payment application of the communication device, or authenticate the user using a service provider accessible through the communication device. If the communication device becomes non-operational (e.g., lack of power or signal strength), the user may be prevented from authenticating through the communication device. Thus, the user may establish a limited use authentication credential from situational data to the user and device (e.g., location or current image) that allows the user to authenticate with the service provider. The authentication credential may be limited to a location, amount, and/or type of authentication.

20 Claims, 5 Drawing Sheets

LIMITED USE AUTHENTICATION ON DETECTION OF NON-OPERATIONAL DEVICE

TECHNICAL FIELD

The present application generally relates to utilizing a device's hardware capabilities to detect device parameters and capture situational data and more specifically to limited use authentication on detection of a device's vulnerability to becoming non-operational.

BACKGROUND

A user may utilize a device, such as a mobile phone, tablet computer, or other type of computing device. The communication device may include payment applications or other types of applications that a user may utilize with other real-world users at a location (e.g., a transportation application, check-in application, etc.). Such applications may require authentication, for example, when providing a payment to a party using a payment account serviced by a payment provider associated with the payment application. The authentication normally may be done using the application on the device, such as multifactor authentication using user passwords, PINs, or other type of input. However, during use of the device, the device may become vulnerable to becoming non-operational through lack of available power or battery level, malfunctioning components, or unavailable signal strength to utilize a network for device communications. Thus, the user may be prevented from utilizing the application if the device becomes non-operational.

Figure 1:
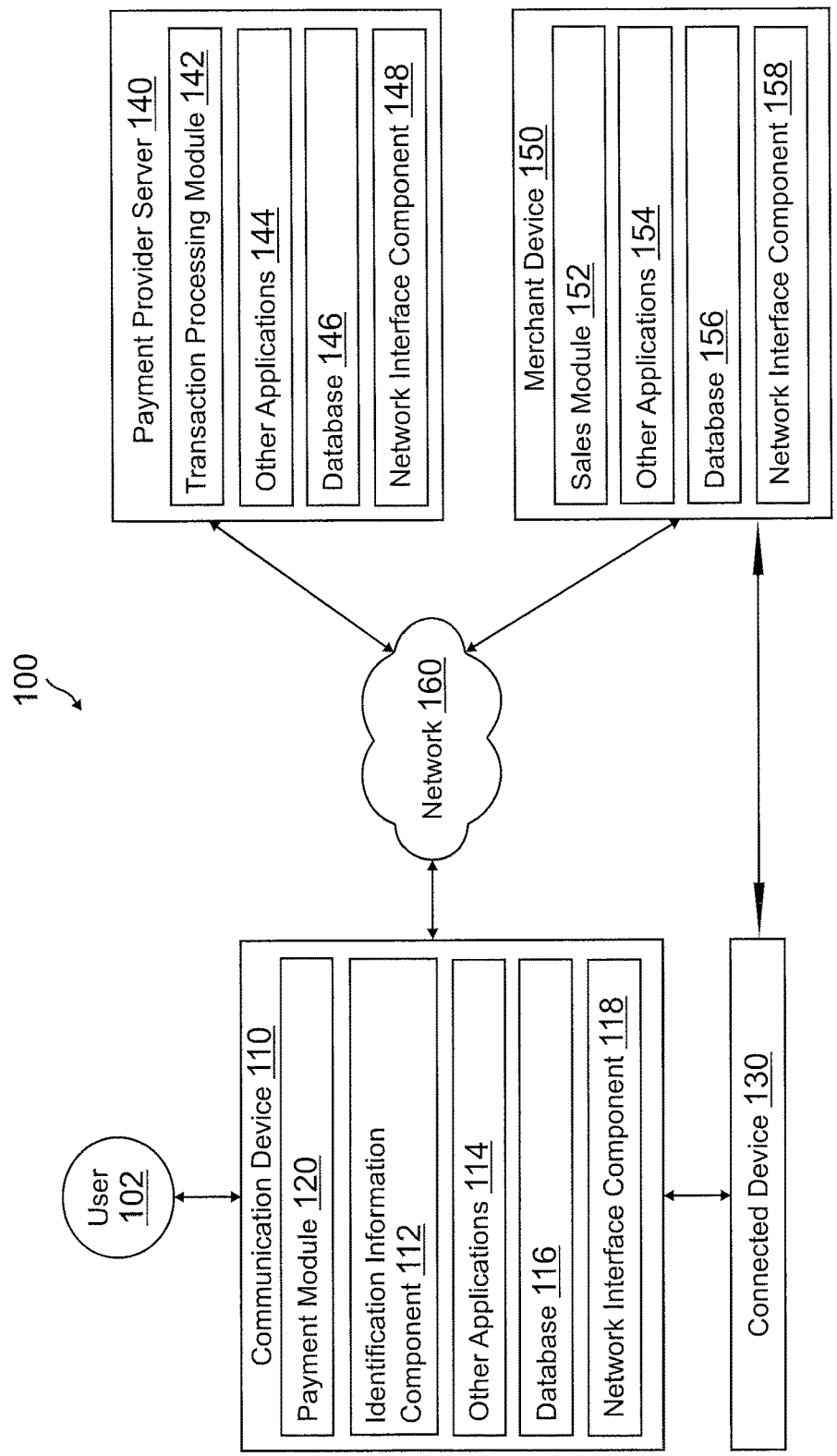
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for limited use authentication on detection of a device's security vulnerability when non-operational. Systems suitable for practicing methods of the present disclosure are also provided.

A user may be in possession of a communication device at various locations, including merchant locations, transportation hubs/terminals, venues for events, travel destinations, or other places where a user may utilize the communication device. When using the communication device, the user may utilize one or more applications, components, or modules to interact with other users at the location. For example, the communication device may include a payment application and associated hardware that may be used to provide payments to a merchant at the location. In other embodiments, the user may wish to verify travel and/or accommodations, or otherwise provide information to a user or interact with the user using an online service provider through and application and components of the communication device. The user may interact with nearby real-world users through the communication device and the processes/features of the communication device. The user may be required to perform authentication when using the processes/features of the communication device, such as accessing the application associated with various processes/features of the communication device and/or utilizing the processes/features (e.g., accessing a payment application and providing payments using the payment application). However, if the communication device becomes non-operational, such as through lack of power/battery, insufficient signal strength, and/or malfunctioning of a device of the device components (e.g., water damage, broken display screen and/or input device, etc.), the user may be prevented from using such processes and/or features of the communication device.

Thus, a service provider may be utilized to generate a limited use authentication credential that may authenticate the user with the service provider when the credential is received from another user's device, such as a merchant's device. The user may provide the limited use authentication credential to the other device in order to authenticate the user and proceed with the interaction between the first user and the nearby user that the first user wishes to interact with but cannot if the first user's communication device is non-operational. The service provider (e.g., a payment provider or other type of service provider associated with the processes/features the first user wishes to use) may detect that the communication device is vulnerable to becoming non-operational. The service provider may receive device parameters that inform the service provider of whether the communication device is vulnerable to becoming non-operational (and an approximate time of when the device may become non-operational, such as a battery power level or remaining battery power time and projected usage). The device parameters may be continuously or intermittently transmitted to the service provider's server by the communication device. In other embodiments, the device parameters may only be communicated to the service provider's server if the communication device detects a conditions indicating potential inoperability (e.g., a low power level, poor signal strength, location with unavailable cell phone signal reception towers, etc.) or may be communicated to the service provider's server on a request by the user when the user becomes aware or concerned that the communication device may become non-operational.

The service provider may then generate a limited use authentication credential for use with the communication device. The limited use authentication credential may be generated using information about the user, the user's environment, or other current information about the circumstance of the user and/or the communication device. For example, the limited use authentication credential may use a current image of the user or the user's surroundings, possessions, or other items (e.g., environment that the user is located in, landmark nearby the user, merchant location images, merchant or merchant employee image, venue admission ticket, or other items) when the device is detected as vulnerable to non-operation. The limited use authentication credential may also include a location for the user, transportation/travel information about the user (e.g., a mode of transportation for the user and/or a rate of travel), an audio or video recording by the user, a current biometric of the user, and/or an environmental parameter of the current environment for the user (e.g., atmospheric pressure, humidity, ambient light, etc.). The information may also correspond to some other unique information or input that may identify the user, such as a recently generated code. The information may be captured by a device component of the communication device, for example, through a communication module connected to an external device or external sensor that captures the information, an input device, a camera, a microphone, an accelerometer, a motion detector, an environmental sensor, and/or a biometric sensor.

All of the aforementioned information may be used to determine the limited use authentication credential as a way to authenticate the user when receiving the aforementioned information. For example, the limited use authentication credential may incorporate the aforementioned information so that when the aforementioned information is received by the service provider's server (e.g., from a merchant device after capturing the aforementioned information used in the limited use authentication credential), the service provider may authenticate the user and interact with the merchant as though the user has been authenticated with the service provider through an application of the communication device. Thus, even in the event on non-operation of the communication device, the user may be authenticated with the service provider in order to process and complete actions with the merchant and the service provider. The user and/or communication device may request a certain type and/or information used to determine the limited use authentication credential, for example, using the information available with the communication device and/or associated with the user. In other embodiments, the service provider may determine what the limited use authentication credential includes for the user to authenticate their identity using the limited use authentication credential, which may be requested from the user or communication device or accessed from previously received information.

The limited use authentication credential may also be generated with one or more validity terms, which may determine how the limited use authentication credential may be used. For example, a validity term may control where the limited use authentication credential may be used to authenticate the user, when or for how long the credential is valid, what the credential may be used to authenticate, or other controlling terms, such as merchants that the credential may be used with, a maximum transaction amount for a transaction the user attempts to authenticate with the credential, a type of item in the transaction, etc. The validity term may be based on received information about the user and/or the user's location/environment. For example, if the user is in a merchant location and limited to travel by foot, the validity term may make the authentication credential only available at that merchant location (or possibly nearby merchant locations within walking distance).

Thus, the user may engage in some action with another user after the user's communication device becomes non-operational. The action may use the service provider, for example, in order to effectuate a payment to a merchant. In order to authenticate the user, the user may request the other user to input the information used for the limited use authentication credential into the other user's device, such as a merchant device. The device may communicate the information (as well as other information, such as transaction information, location information, user information for the other user, etc.) to the service provider. The service provider may then match the received information to the known information for the limited use authentication credential. If the received information matches the information for the limited use authentication credential, the user may be authenticated and the action with the service provider may proceed. Additionally, information associated with the other merchant, user, transaction, etc., also received may be processed with the validity term(s) to determine whether the action instituted by the user with the other user is within the limits of the validity term(s). If the received information does not match the limited use authentication credential and/or the validity term(s), the action between the user and the other user using the service provider may not be processed and the user may not be authenticated. Additionally, the service provider may alert the user, the merchant, and/or another authority entity of potential fraud. Additionally, on expiration of the validity term(s) and/or on detection that the communication device becomes operable again, the limited use authentication credential may be invalidated.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, standalone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a communication device 110, a connected device 130, a payment provider server 140, and a merchant device 150 in communication over a network 160. User 102 may utilize communication device 110 to utilize the various features available for communication device 110, which may include processes to access and use services offered by payment provider server 140. Payment provider server 140 may be used to detect that communication device 110 is vulnerable to becoming non-operational and, thus, preventing user 102 from using the features of communication device 110. Thus, payment provider server 140 may be used to generate a limited use authentication credential for user 102 with the services offered by payment provider server 140, which may include one or more validity terms governing authentication and use of the credential. The credential may be communicated to communication device 110 and/or connected device 130 prior to inoperability of communication device 110. Once communication device 110 become non-operational, user 102 may have a merchant for merchant device 150 capture the information used for the limited use authentication credential and communicate the information to payment provider server 140 for authentication of user 102 with payment provider server 140. In various embodiments, connected device 130 may provide the information to merchant device 150.

Communication device 110, connected device 130, payment provider server 140, and merchant device 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

Communication device 110 may be implemented as a communication device that may utilize appropriate hardware and software configured for wired and/or wireless communication with payment provider server 140 and/or merchant device 150. For example, in one embodiment, communication device 110 may be implemented as a personal computer (PC), a smart phone, laptop/tablet computer, wristwatch with appropriate computer hardware resources, eyeglasses with appropriate computer hardware (e.g. GOOGLE GLASS ®), other type of wearable computing device, implantable communication devices, and/or other types of computing devices capable of transmitting and/or receiving data, such as an IPAD® from APPLE®. Although a communication device is shown, the communication device may be managed or controlled by any suitable processing device. Although only one communication device is shown, a plurality of communication devices may function similarly.

Communication device 110 of FIG. 1 contains a payment module 120, an identification information component 112, other applications 114, a database 116, and a communication module 118. Payment module 120 and other applications 114 may correspond to executable processes, procedures, and/or applications with associated hardware. In other embodiments, communication device 110 may include additional or different modules having specialized hardware and/or software as required.

Payment module 120 may correspond to one or more processes to execute modules and associated devices of communication device 110 to initiate, receive, and/or process/complete transactions with a merchant as well as detect device parameters of communication device 110 and provide the device parameters and/or current user/environment information to payment provider server 140 for use in generating a limited use authentication credential. In this regard, payment module 120 may correspond to specialized hardware and/or software utilized by communication device 110 to provide a convenient interface to permit user 102 to select payment options and provide payment for items, for example, to a merchant associated with merchant device 150 using payment provider server 140. Payment module 120 may be implemented as a user interface enabling user 102 to enter payment options for storage by communication device 110, provide those payment options on checkout/payment of one or more items with the merchant corresponding to merchant device 150, and complete a transaction for the item(s) through a purchase request for the item(s). In various embodiments, payment module 120 may include a general browser application configured to retrieve, present, and communication information over the Internet (e.g., utilize resource on the World Wide Web) or a private network. For example, payment module 120 may provide a web browser, which may send and receive information over network 160, including retrieving website information, presenting the website information to user 102, and/or communicating information to the website, including payment information. However, in other embodiments, payment module 120 may include a dedicated application of payment provider server 140 or other entity (e.g., a merchant), which may be configured to assist in processing purchase requests and/or determining conflicting times in calendar information for user 102. Moreover, in other embodiments, payment provider server 140 may not perform transaction processing, and may instead correspond to another service provider, where payment module 120 may include processes to access and utilize service provided by such a service provider.

User 102 may browse items for sale at a physical location, such as a merchant location. User 102 may select an item for purchase and generate or receive a purchase request for a transaction to purchase the item using payment module 120. For example, user 102 may wish to complete the transaction to purchase the item. User 102 may utilize payment module 120 to generate a purchase request for the item(s) and provide or identify payment information to complete the transaction. Payment module 120 may utilize user financial information, such as a credit card, bank account, or other financial account, as a payment instrument when providing payment information for use in a purchase request. Additionally, payment module 120 may utilize a user account with payment provider, such as payment provider server 140, as the payment instrument. Payment provider server 140 may therefore provide payment processing. The purchase request may be communicated to payment provider server 140 for processing to complete the transaction for the item using the user financial information. In various embodiments, the purchase request may be communicated to a merchant server or device (e.g., as a payment token for the item) directly or over network 160 for communication to payment provider server 140, or may be communicated to payment provider server 140 over network 160 (e.g., as a payment token including merchant identification for payment to the merchant selling the item). The payment request may include identification of the transaction and a request to purchase the items in the transaction.

However, communication device 110 may become non-operational so that payment module 120 may not be used to process and complete payments for the transaction at the merchant location (or provide another service to user 102 where payment provider server 140 corresponds to another type of service provider). Payment module 120 may be used to detect device parameters associated with inoperability, such as power/battery levels, location, signal strength, and/or malfunctioning device components. The device parameters may be provided to payment provider server 140 over network 160 continuously, at set intervals, if the device parameters meet a threshold indicating potential future non-operation (e.g., a low battery level), or on a user request (e.g., if the user thinks the device may become non-operational). As discussed herein, the device parameters may be used to determine if communication device 110 is vulnerable to becoming non-operational by payment provider server 140 and cause payment provider server 140 to determine a limited use authentication credential for use in authenticating user 102 while communication device 110 is non-operational.

Payment module 120 may also be used to provide current information for user 102 and/or an environment or item selected by user 102 for use in determining the limited use authentication credential to payment provider server 140.

The current information may be captured using a device component of communication device 110, for example, communication module 118 connected to an external device or external sensor that captures the information (e.g., connected device 130), an input device, a camera, a microphone, an accelerometer, a motion detector, an environmental sensor, and/or a biometric sensor. The information may include a current image of user 102 or user 102's surroundings, possessions, or other item (e.g., environment that user 102 is located in, landmark nearby user 102, merchant location images, merchant or merchant employee image, venue admission ticket, or other item) when communication device 110 is detected as vulnerable to non-operation. The limited use authentication credential may also include a location for user 102, transportation/travel information about user 102 (e.g., a mode of transportation for user 102 and/or a rate of travel), an audio or video recording by user 102 (e.g., a voice command or video recording of an arm/hand movement by user 102), a current biometric of user 102, and/or an environmental parameter of the current environment for user 102 (e.g., atmospheric pressure, humidity, ambient light, etc.). The information may also correspond to some other unique information or input that may identify user 102, such as a recently generated code.

Communication device 110 may collect and/or determine the information when communication device 110 is vulnerable to becoming non-operational, on a request by user 102, and/or on a request by payment provider server 140 when payment provider server 140 determines that communication device 110 is vulnerable to becoming non-operational. Payment module 120 may instruct user 102 on how to capture the information, for example, what to image using a camera of communication device 110. In other embodiments, the information may be collected and/or determined passively without input and/or action by user 102. Once the information is received by payment provider server 140, the information may be used to provide authentication to user 102 for services provided by payment provider server 140 without communication device 110 as a limited use authentication credential. In various embodiments, user 102 may be alerted of the required information to present to merchant device 150 as the limited use authentication credential through payment module 120. Moreover, where the limited use authentication credential corresponds to a token (e.g., including an encrypted code), the limited use authentication credential may be communicated to communication device 110 for transmission to connected device 130, which may provide the token to merchant device 150 during authentication.

Identification information component 112 may correspond to one or more processes and/or specialized hardware of communication device 110 to collect and/or determine current information used by payment provider server 140 to generate a limited use authentication credential that provides authentication by providing the information to merchant device 150 when authentication for user 102 with payment provider server 140 is required. In this regard, identification information component 112 may correspond to specialized hardware and/or software that may collect and/or determine information about a user, a user's location or environment, current circumstances of the user, and/or a landmark, sign, possession, or other item the user may wish to use as a limited use authentication credential. Identification information component 112 may correspond to one or more of a network interface module, a communication module connected to an external device or external sensor, a keypad, a mouse, a touchscreen interface, a camera, a microphone, an accelerometer, a motion detector, an environmental detector (e.g., barometer, altimeter, GPS sensor, etc.), and/or a biometric sensor. As previously discussed, the information may be collected and/or determined by identification information component 112. Payment module 120 may then use the information collected/determined by identification information component 112 and communicate the information to payment provider server 140 for determination of a limited use authentication credential.

In various embodiments, one or more the discussed hardware and/or software features of payment module 120 and identification information component 112 may be included in the same module.

In various embodiments, communication device 110 includes other applications 114 as may be desired in particular embodiments to provide features to communication device 110. For example, other applications 114 may include security applications for implementing client-side security features, programmatic client applications for interfacing with appropriate application programming interfaces (APIs) over network 160, or other types of applications. Other applications 114 may also include email, texting, voice and IM applications that allow a user to send and receive emails, calls, texts, and other notifications through network 160. In various embodiments, other applications 114 may include financial applications, such as banking, online payments, money transfer, or other applications. Other applications 114 may also include other applications, which may be used with a service provider that requires authentication for use of the service provider's services. As previously discussed, other applications may include social networking applications and/or merchant applications. Other applications 114 may include device interfaces and other display modules that may receive input from user 102 and/or output information to user 102. For example, other applications 114 may contain software programs, executable by a processor, including a graphical user interface (GUI) configured to provide an interface to the user.

Communication device 110 may further include database 116 stored to a transitory and/or non-transitory memory of communication device 110, which may store various applications and data and be utilized during execution of various modules of communication device 110. Thus, database 116 may include, for example, identifiers such as operating system registry entries, cookies associated with payment module 120 and/or other applications 114, identifiers associated with hardware of communication device 110, or other appropriate identifiers, such as identifiers used for payment/user/device authentication or identification. Database 116 may include device parameters, which may include current power level, availability of device components and status/health of such components, and/or signal strength of a network signal for communication device 110. Additionally, current information collected by identification information component 112 may be stored to database 116 for use with the authentication credentials (e.g., generation of a limited use authentication credential).

Communication device 110 includes at least one communication module 118 adapted to communicate with payment provider server 140 and/or merchant device 150. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with nearby devices using short range communications, such as Bluetooth Low Energy, LTE Direct, WiFi, radio frequency, infrared, Bluetooth, and near field communications.

Connected device 130 may correspond to a device communicatively connected to communication device 110, which may be used for collecting and/or determining current information associated with user 102 and/or storing a received limited use identification credential in the event of inoperability of communication device 110. In various embodiments, connected device 130 includes a processor, memory for storing received and/or transmitted information, and one or more communications modules which may provide network and/or short range wireless communication to connected device 130, for example, over network 160 or using Bluetooth Low Energy, LTE Direct, WiFi, radio frequency, infrared, Bluetooth, and near field communications. Additionally, connected device 130 may include a sensor or other component used to collect the current information associated with user 102, such as an input device, a camera, a microphone, an accelerometer, a motion detector, an environmental sensor, and/or a biometric sensor. In various embodiments, connected device 130 may correspond to a wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as a FITBIT®.

Payment provider server 140 may be maintained, for example, by an online payment service provider, which may provide payment services and/or processing for financial transactions on behalf of users. In this regard, payment provider server 140 includes one or more processing applications which may be configured to interact with communication device 110, merchant device 150, and/or another device/server to facilitate payment for a transaction, including establishment of a limited use authentication credential in the event that communication device 110 becomes non-operational and may not be used to authenticate user 102 with payment provider server 140. In one example, payment provider server 140 may be provided by PAYPAL®, Inc. of San Jose, Calif., USA. However, in other embodiments, payment provider server 140 may be maintained by or include a credit provider, financial services provider, financial data provider, and/or other service provider, which may provide payment services to user 102.

Payment provider server 140 of FIG. 1 includes transaction processing module 142, other applications 144, a database 146, and a network interface component 148. Transaction processing module 142 and other applications 144 may correspond to executable processes, procedures, and/or applications with associated hardware. In other embodiments, payment provider server 140 may include additional or different modules having specialized hardware and/or software as required.

Transaction processing module 142 may correspond to one or more processes to execute modules and associated specialized hardware of payment provider server 140 to receive and/or transmit information from communication device 110 for establishing payment accounts for user 102, processing and completing of one or more transactions initiated by user 102 using the payment accounts, and determining a limited use authentication credential for user 102 in the event communication device 110 that becomes non-operational. In this regard, transaction processing module 142 may correspond to specialized hardware and/or software to establish payment accounts, which may be utilized to send and receive payments and monetary transfers and engage in other financial transactions. User 102 may establish a payment account with transaction processing module 142 by providing personal and/or financial information to payment provider server 140 and selecting an account login, password, and other security information. The payment account may be accessed through a browser application and/or dedicated payment application executed by communication device 110, such as an application associated with payment module 120. Thus, user 102 and payment provider server 140 may protect and limit use of the payment account or other payment services offered by payment provider server 140 using authentication required to access the application and/or engage in services offered by payment provider server 140 (e.g., single factor or multifactor authentication through a password, personal identification number, fingerprint, etc.). In other embodiments, payment provider server 140 may correspond to another type of service provider and transaction processing module 142 may correspond to another type of service module, which may require authentication and provide limited use authentication credentials as discussed herein.

Transaction processing module 142 may determine that communication device 110 is vulnerable to becoming non-operational, for example, using device parameters. As discussed herein, device parameters may correspond to the hardware and/or software health of communication device 110, which may include power levels and available power, ability to recharge power resources or gain power, signal strength, location of the device for use in determining whether the device may run out of power before additional power is available or may move into an area where communication signals with the device may deteriorate or the device may become inaccessible over a network, and/or malfunctioning components of communication device 110 that may render communication device 110 impaired during use (e.g., unable to process authentication with payment provider server 140) and non-operational. Transaction processing module 142 may then determine that user 102 may require a limited use authentication credential. Transaction processing module 142 may access the current information for user 102 collected and/or determined by communication device 110 and for use in authenticating user 102. As discussed herein, the current information may correspond to images, recordings, biometrics, or other data when communication device 110 is vulnerable to becoming non-operational or within a time frame of when communication device 110 is detected as becoming non-operational.

Transaction processing module 142 may then generate the limited use authentication credential using the current information for user 102, a surrounding of user 102, an item nearby or in possession of user 102, or other relevant local information. The limited use authentication credential may therefore authenticate user 102 when data having the information is received by payment provider server 140, for example, from merchant device 150. Transaction processing module 142 may also determine one or more validity terms for the limited use authentication credential. A validity term may correspond to a location, time, use, or other limit-based limitation on user of the limited use authentication credential. For example, a validity term may only authenticate user 102 on receipt of data having the information matching the limited use authentication credential for certain locations, for a certain time or time period, with specific merchants, for a transaction or item type, for a transaction amount, or other type of limitation on a service provided after authentication of user 102. The validity term may also be determined using the current information for user 102, such as a location, current time or time of expected inoperability of communication device 110, transportation mode, travel route/plans, merchant information/location, required or desired purchases by user 102, etc. Transaction processing module 142 may limit the use of the limited use authentication credential by the validity term(s) for the credential.

Transaction processing module 142 may alert user 102 of creation of the limited use authentication credential prior to inoperability of communication device 110. In various embodiments, transaction processing module 142 may request a certain type of current information for generation of the limited use authentication credential or user 102 may provide certain information. However, in other embodiments, transaction processing module 142 may inform user 102 of the information required to authenticate user 102 using the limited use authentication credential, which may include what user 102 and/or a merchant associated with merchant device 150 should image, record, or otherwise capture when user 102 wishes to authenticate an action between the user and the merchant, where the action requires some response by payment provider server 140 (e.g., transaction authorization and payment). Transaction processing module 142 may also alert user 102 of the validity term(s) for the limited use authentication credential so that user 102 is aware of the limits on use of the limited use authentication credential for authenticating user 102's actions. Transaction processing module 142 may then store the limited use authentication credential with database 146 for use when data is received from merchant device 150 requesting authentication through the limited use authentication credential. Moreover, on detection of communication device 110 becoming operable after inoperability, transaction processing module 142 may delete, invalidate, or otherwise terminate the limited use authentication credential. Transaction processing module 142 may do likewise on expiration of one or more validity terms for the limited use authentication credential.

Transaction processing module 142 may further process a received transaction from communication device 110 and/or merchant device 110 by receiving the transaction a payment request for a payment for the transaction. Where communication device 110 communicates the payment request to payment provider server 140, the payment request may correspond to a payment token, including a payment instrument and identification of the transaction, and may be encrypted prior to transmission to transaction processing module 142 to prevent unauthorized receipt of a payment instrument. The payment token may include information corresponding to user identifiers, user financial information/identifiers, transaction information and/or other identifiers. Additionally, the payment token may include a payment amount and terms of payment for the transaction.

When communication device 110 is operational, user 102 may be authenticated for transactions based on input authentication to payment module 120, such as single or multifactor authentication requirements (e.g., a user name, password, PIN, fingerprint, etc.). However, where communication device 110 becomes non-operational, transaction processing module 142 may receive a transaction having transaction information requesting a payment from a payment account of user 102 to the merchant associated with merchant device 150. In order to authenticate user 102 without user 102 having to provide sensitive information (e.g., user name, password, PIN, fingerprint, etc.) to merchant device 150, user 102 can provide the information used for authentication using the limited use authentication credential to merchant device 150 as a credential allowing for completion of the transaction. Merchant device 150 may communicate the received credential to payment provider server 140 with the transaction information and the payment request for the transaction. Transaction processing module 142 may then match the received credential for the transaction with the limited use authentication credential. If the two credentials match, user 102 may be authenticated for the transaction with the merchant corresponding to merchant device 150, and transaction processing module 142 may begin processing the transaction. However, if the credentials do not match, the transaction may not be processed and payment may not be provided. Moreover, the merchant and/or an authority entity may be alerted of fraud. Transaction processing module 142 may also match the transaction information and/or merchant information to the validity terms of the limited use authentication credential when performing authentication to determine whether the transaction is within the limitations of the validity term(s).

Once the transaction is received and user 102 is authenticated, transaction processing module 142 may utilize a payment account or financial information (e.g., a payment instrument such as a credit/debit card, bank account, etc.) of user 102 to render payment for the transaction. Payment may be made to merchant device 150 or another user device using the payment instrument and the terms of the payment request, or may be made to an account for a merchant associated with merchant device 150. Additionally, transaction processing module 142 may provide transaction histories, including receipts, to communication device 110 and/or merchant device 150, or may store the transaction histories to the user's account and/or the merchant's account.

In various embodiments, payment provider server 140 includes other applications 144 as may be desired in particular embodiments to provide features to payment provider server 134. For example, other applications 144 may include security applications for implementing server-side security features, programmatic client applications for interfacing with appropriate application programming interfaces (APIs) over network 160, or other types of applications. Other applications 144 may contain software programs, executable by a processor, including a graphical user interface (GUI), configured to provide an interface to user 102 when accessing payment provider server 134. In various embodiments where not provided by transaction processing module 142, other applications 144 may include connection and/or communication applications, which may be utilized to communicate information to over network 160.

Additionally, payment provider server 140 includes database 146. As previously discussed, user 102 and/or the merchant corresponding to merchant location 130/merchant server 140 may establish one or more payment accounts with payment provider server 140. Payment accounts in database 146 may include user/merchant information, such as name, address, birthdate, payment/funding information, additional user financial information, and/or other desired user data. User 102 and/or the merchant may link to their respective payment accounts through a user, merchant, and/or device identifier. Thus, when an identifier is transmitted to payment provider server 140, e.g. from communication device 110, merchant devices 132, and/or merchant server 140, a payment account belonging to user 102 and/or the merchant may be found. Payment amounts may be deducted from one payment account and paid to another payment account. In other embodiments, user 102 and/or the merchant may not have previously established a payment account and may provide other financial information to payment provider server 140 to complete financial transactions, as previously discussed.

In various embodiments, payment provider server 140 includes at least one network interface component 148 adapted to communicate communication device 110, merchant devices 132, and/or merchant server 140 over network 160. In various embodiments, network interface component 148 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

A physical merchant location may correspond to merchant device 150, which may correspond to a point of sale (POS) and/or check-out machine/device. Merchant device 150 may be maintained, for example, by a merchant or seller offering various items, products, and/or services through the physical merchant location. Generally, merchant device 150 may be maintained by anyone or any entity that receives money, which includes charities as well as retailers and restaurants. In this regard, merchant device 150 may include a device having processing applications, which may be configured to interact with communication device 110 and/or payment provider server 140 to facilitate the sale of items using one or more limited use authentication credentials when communication device 110 becomes non-operational.

Merchant device 150 may be implemented using any appropriate hardware and software configured for wired and/or wireless communication with communication device 110 and/or payment provider server 140. For example, in one embodiment, merchant device 150 may be implemented as a single or networked personal computer (PC), a smart phone, laptop computer, wearable computing device, and/or other types of computing devices at a merchant location capable of transmitting and/or receiving data. Although a merchant device is shown, the merchant device may be managed or controlled by any suitable processing device. Although only one merchant device is shown, a plurality of merchant devices may function similarly.

Merchant device 150 of FIG. 1 contains a sales module 152, other applications 154, a database 156, and a network interface component 158. Sales module 152 and other applications 154 may correspond to processes, procedures, and/or applications executable by a hardware processor, for example, a software program. In other embodiments, merchant device 150 may include additional or different modules having specialized hardware and/or software as required.

Sales module 152 may correspond to one or more processes to execute modules and associated specialized hardware of merchant device 150 that provide checkout and payment processes, which may be configured to complete transactions for items. In this regard, sales module 152 may correspond to specialized hardware and/or software of merchant device 150 to provide a convenient interface to permit a merchant to enter, view, and/or edit items and/or services for purchase by user 102. For example, sales module 152 may be implemented as an application having a user interface enabling the merchant to enter item information and request payment for a transaction on checkout/payment of one or more items/services. In certain embodiments, sales module 152 may correspond more generally to a web browser configured to view information available over the Internet or access a website corresponding to the merchant and/or payment provider server 140.

Once a payment amount is determined for a transaction for items to be purchased by user 102, sales module 152 may request payment from user 102. Where communication device 110 is operable, payment module 120 and sales module 152 may interact to complete payment using payment provider server 140, as discussed herein. However, if communication device 110 becomes non-operational, user 102 may still utilize a payment account with payment provider server 140 by having a merchant (or merchant employee) utilizing merchant device 150 input information for an authentication credential used to identify and authenticate user 102 when communication device 110 is non-operational. The authentication credential may correspond to the limited use authentication determined by payment provider server 140. Thus, the information input by user 102 may correspond to the information used to authenticate user 102 using the limited use authentication credential, such as an image, recording, biometric, etc. As previously discussed, merchant device 150 may scan the information, input the information using an input device, image the information with a camera or video recorder, record an audio recording with a microphone, capture a biometric using a sensor, or otherwise input the information. The provided information may then be used as a credential and communicated to payment provider server 140 with the transaction and transaction information by sales module 152 for approval. As discussed herein, payment provider server 140 may perform matching on the provided credential information and the stored limited use authentication credential and determine whether to approve or decline the transaction. Sales module 152 may then receive the results of the credential and transaction processing, and complete the transaction with user 102, for example, by providing the user the items for the transaction or declining the transaction where user 102 is not authenticated or the transaction is not authorized (e.g., insufficient funds).

Merchant device 150 includes other applications 154 as may be desired in particular embodiments to provide features to merchant device 150. For example, other applications 154 may include security applications for implementing client-side security features, programmatic client applications for interfacing with appropriate application programming interfaces (APIs) over network 160, or other types of applications. Other applications 154 may also include email, texting, voice and IM applications that allow a user to send and receive emails, calls, texts, and other notifications through network 160. In various embodiments, other applications 154 may include financial applications, such as banking, online payments, money transfer, or other applications associated with payment provider server 140. Other applications 144 may contain software programs, executable by a processor, including a graphical user interface (GUI) configured to provide an interface to the user.

Merchant device 150 may further include database 156 which may include, for example, identifiers such as operating system registry entries, cookies associated with sales module 152 and/or other applications 154, identifiers associated with hardware of merchant device 150, or other appropriate identifiers, such as identifiers used for payment/user/device authentication or identification. Identifiers in database 156 may be used by a payment/credit provider, such as payment provider server 140, to associate merchant device 150 with a particular account maintained by the payment/credit provider. Database 156 may further include a transaction between user 102 and a merchant corresponding to merchant device 150, as well as transaction information, input information for a credential used to authorize the transaction with payment provider server 140, and/or transaction confirmation and transaction histories.

Merchant device 150 includes at least one network interface component 158 adapted to communicate with communication device 110 and/or payment provider server 140. In various embodiments, network interface component 158 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. In various embodiments, merchant device 150 may include a communication module, which may communicate directly with communication device 110 using short range wireless communications, such as radio frequency, infrared, Bluetooth, and near field communications.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

Figure 2:
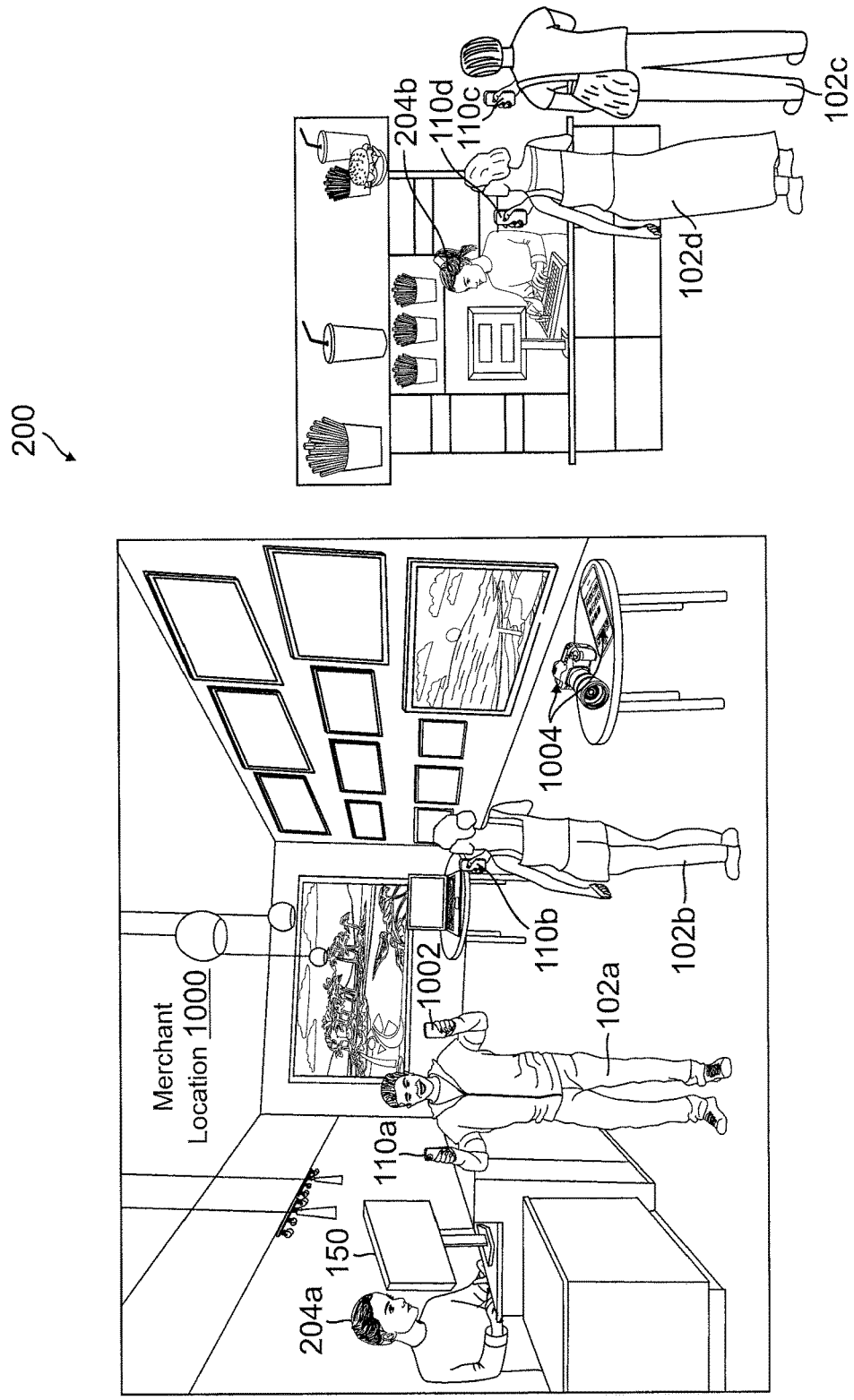
FIG. 2 is an environment where users may cause to be generated limited use authentication credentials for use in transactions with merchants if the users' communication devices are vulnerable to becoming non-operational, according to an embodiment.

FIG. 2 is an environment where limited use authentication credentials may be generated for use in transactions with merchants if the users' communication devices are vulnerable to becoming non-operational, according to an embodiment. Environment 200 includes a user 102a having a communication device 110a, a user 102b having a communication device 110b, a user 102c having a communication 110c, and a user 102d having a communication device 110d all corresponding generally to user 102 having communication device 110, respectively, from environment 100 of FIG. 1. Moreover, environment 200 includes merchant device 150 discussed in reference to environment 100.

In environment 200, a merchant location 1000 may sell an item 1002 and include available items 1004 that users 102a and 102b may browse for purchase while at merchant location 1000. While at merchant location 1000, user 102a may wish to purchase item 1002. However, when approaching merchant 204a in order to complete a purchase for the item using communication device 110a and merchant device 150, user 102a may view communication device 110a and realize communication device 110a is non-operational from lack of battery power. However, user 102a may have previously caused a limited use authentication credential to be generated, where the limited use authentication credential uses an image of user 102a in user 102a's current clothing for authentication. Thus, user 102a may instruct merchant 204a to capture an image of user 102a using merchant device 150. Merchant 204a may then receive authorization for a transaction for item 1002 when a payment provider authenticates user 102a using the image and the stored limited use authentication credential.

Similarly, user 102b may realize that communication device 110b may have low battery or poor signal strength. User 102b may wish to purchase one of available items 1004. Thus, user 102b may quickly submit information for use in determining a limited use authentication credential. In certain embodiments, the information may be an image user 102b captures of one or more of available items 1004, a voice/video recording, a current biometric, or an image or reading of the environment for merchant location 1000. User 102b may then receive identity authentication using the submitted information when user 102b wishes to purchase one of available items 1004.

In a remote location, user 102c may be purchasing items using communication device 110c while communication device 110c is charged. However, communication device 110c may become non-operational and user 102c may cause a user 102c to have a limited use authentication credential generated. User 102d may be a fraudster that may attempt to utilize user 102b's or user 102c's payment account by submitting information similar to their limited use authentication credential. Where user 102d fails to submit similar information, the payment provider may reject use of user 102b's or user 102c's payment account. However, where user 102d attempts to submit information similar to user 102b's limited use authentication credential, one or more validity terms with the authentication credential may determine user 102d is too far from a valid area (e.g., merchant location 1000) where the limited use authentication credential may be used, or is not within a temporal span of validity. Similarly, if user 102d uses user 102'c authentication credential, the payment provider may view a recent similar transaction at the same merchant and flag the transaction as suspicious or decline to process the transaction and pay for the transaction.

Figure 3:
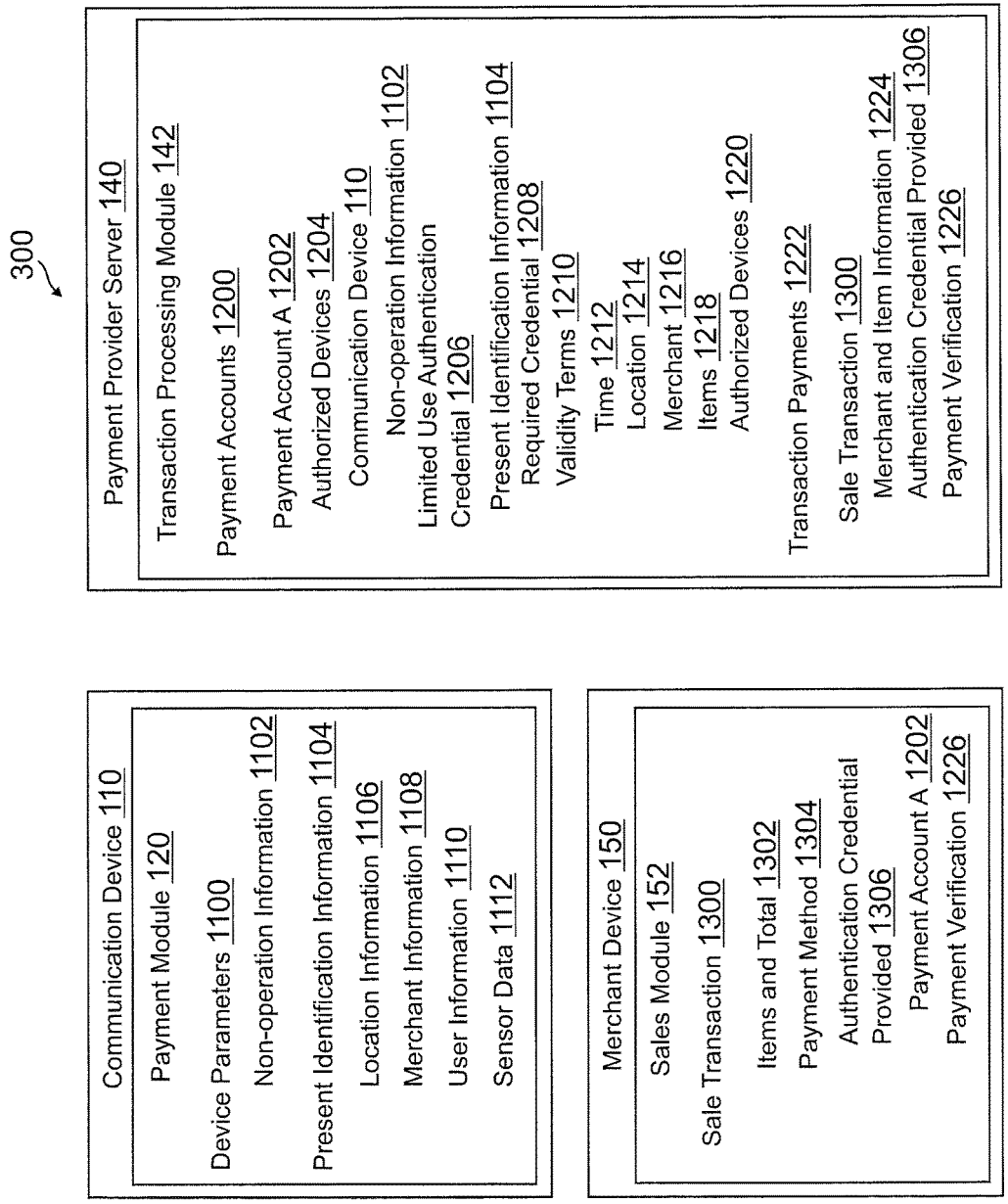
FIG. 3 is an exemplary interactions between a communication device and a payment provider server for generation of a limited use authentication credential used with a merchant device, according to an embodiment.

FIG. 3 is an exemplary interaction between a communication device and a payment provider server for generation of a limited use authentication credential used with a merchant device, according to an embodiment. Environment 300 of FIG. 3 includes communication device 110, a payment provider server 140, and a merchant device 150 from environment 100 of FIG. 1 executing module and processes discussed in reference to environment 100.

Communication device 110 executes payment module 120 corresponding generally to the specialized hardware and/or software modules and processes described in reference to FIG. 1. In this regard, payment module 120 may be used to establish a limited use authentication credential. For example, payment module 120 includes device parameters 1100 and present identification information 1104. Device parameters 1100 may be used to determine whether communication device 110 is vulnerable to becoming non-operational, such as non-operation information 1102, which may include battery power, device and component health, projected or estimated device usage, such as based on use history or current location, and/or signal strength. Present identification information 1104 may include current information used to generate a limited use authentication credential, such as location information 1106, merchant information 1108, user information 1110, and/or sensor data 1112.

Payment provider server 140 executes transaction processing module 142 corresponding generally to the specialized hardware and/or software modules and processes described in reference to FIG. 1. In this regard, transaction processing module 142 may be used to generate a limited use authentication credential and authorize transaction payments on receipt of information matching the limited use authentication credential. Thus, transaction processing module 142 includes payment accounts 1200 and transaction payments 1222. Payment accounts 1200 may include a payment account A 1202 associated with a user (not shown) of communication device 110, which may require a limited use authentication credential in order to continue authorizing transaction payments when communication device 110 becomes non-operational. Payment account A 1202 includes authorized devices 1204, such as communication device 110 having non-operation information 1102. A limited use authentication credential 1206 may be generated using present identification information 1104. For example, limited use authentication credential 1206 may include required credential 1208, such as information required to be submitted to transaction processing module 142 for authentication. Additionally, authentication credential 1206 may include validity terms 1210, such as a time 1212, location 1214, merchant 1216, items 1218, and/or authorized device 1220 required to be met for authentication validity.

Merchant device 150 executes sales module 152 corresponding generally to the specialized hardware and/or software modules and processes described in reference to FIG. 1. In this regard, sales module 152 may be used to generate a transaction, receive information for a credential by a user, and submit the transaction and credential information to payment provider server 140 for approval. Thus, sales module 1542 includes a sale transaction 1300 having items and total 1302. Additionally, sale transaction 1300 includes a payment method 1304, which may include an authentication credential provided 1306, a payment account A 1202 identifier, and a payment verification 1226 status. Thus, after providing sale transaction 1300 to transaction processing module 142, transaction processing module 142 may process sale transaction 1300 as transaction payments 1222, for example, using merchant and item information 1224 and authentication credential provided 1306 to return payment verification 1226.

Figure 4:
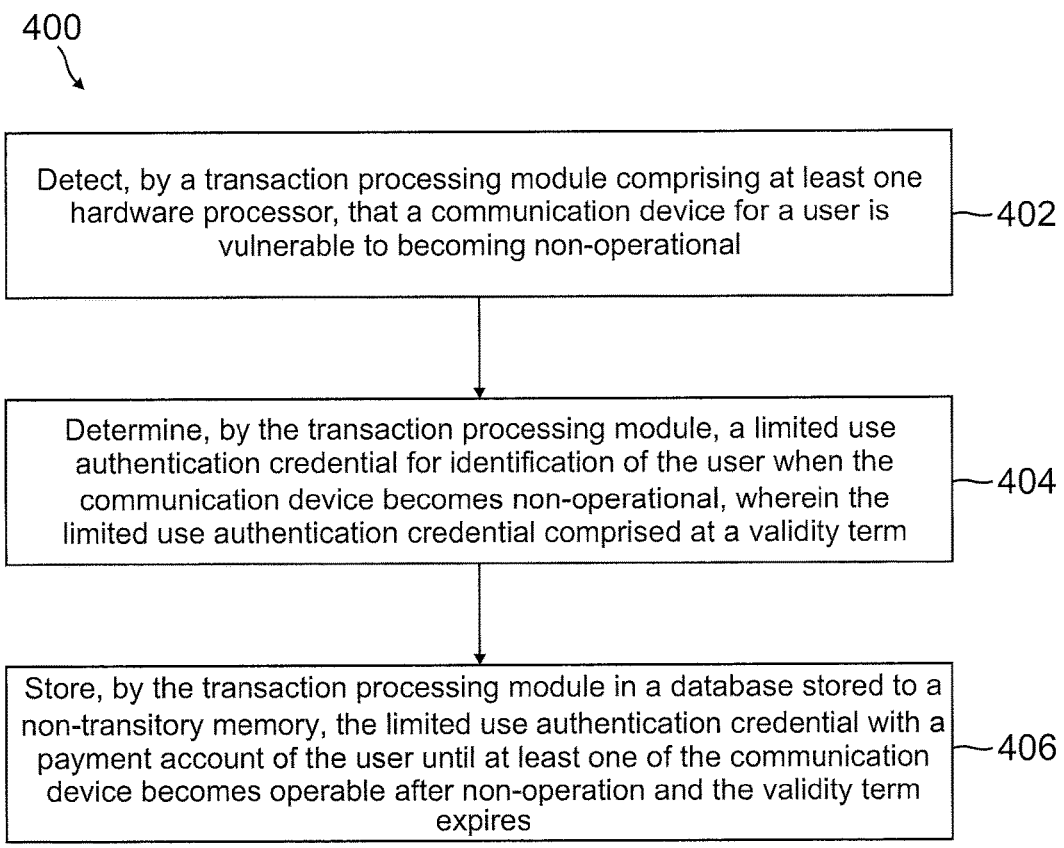
FIG. 4 is a flowchart of an exemplary process for limited use authentication on detection of a device's vulnerability when non-operational, according to an embodiment.

FIG. 4 is a flowchart of an exemplary process for limited use authentication on detect of a device's vulnerability to non-operational, according to an embodiment. Note that one or more steps, processes, and methods described herein may be omitted, performed in a different sequence, or combined as desired or appropriate.

At step 402, a transaction processing module comprising at least one hardware processor detects that a communication device for a user is vulnerable to becoming non-operational, for example, using device and/or network parameters associated with the communication device. A network interface component may receive the device parameters from the communication device, and wherein the device parameters comprises at least one of a power level of the communication device, a malfunctioning warning for the communication device, a signal strength for a communication signal used by the communication device, and a location of the communication device and used to determine available signal towers for communication with the communication device (or other information necessary to determine an available power level, a network coverage area associated with a location of the communication device, and a malfunctioning component of the communication device). In various embodiments, the device parameters may be received without user input to the communication device, for example, if the communication device detects that it may become non-operational.

A limited use authentication credential for identification of the user when the communication device becomes non-operational is determined, by the transaction processing module, wherein the limited use authentication credential comprises at least one validity term, at step 404. The network interface component may receive information from the communication device when the communication device is vulnerable to becoming non-operational, wherein the limited use authentication credential is determined using the information for use in authorizing a transaction between a merchant and the user using a payment account of the user, and wherein the information is matched by the transaction processing module to received transaction information from a merchant device of the merchant during processing of the transaction by the payment provider. For example, the information may comprise at least one of an image of the user when the communication device is vulnerable to becoming non-operational, an image of a surrounding environment of the user when the communication device is vulnerable to becoming non-operational, an image of the merchant at or nearby the user when the communication device is vulnerable to becoming non-operational, an image of a landmark when the communication device is vulnerable to becoming non-operational, a location of the user when the communication device is vulnerable to becoming non-operational, transportation information for the user, travel information for the user, an audio recording generated by the user when the communication device is vulnerable to becoming non-operational, a video recording generated by the user when the communication device is vulnerable to becoming non-operational, a current biometric of the user when the communication device is vulnerable to becoming non-operational, and an environmental parameter when the communication device is vulnerable to becoming non-operational.

The information used to determine the limited use authentication credential may be captured or determined using a device component of the communication device, and wherein the device component comprises one of a communication module connected to an external device or external sensor that captures the information, an input device, a camera, a microphone, an accelerometer, a motion detector, an environmental sensor, and a biometric sensor. The user may initiate a request for the limited use authentication credential, and wherein the request is received with the device parameters.

The at least one validity term may comprise a limit on at least one of a location for a transaction, a time for the transaction, a merchant for the transaction, an item in the transaction, and a monetary amount for the transaction. At step 406, the limited use authentication credential is stored, by the transaction processing module in a database stored to a non-transitory memory, with a payment account of the user until at least one of the communication device becomes operable after non-operational and the at least one validity term expires. The network interface component may also receive a notice that that the communication device is active after the communication device has become non-operational, wherein the transaction processing module invalidates the limited use authentication credential one receipt of the notice.

A merchant may input a credential provided by the user to the merchant into a merchant device, wherein the network interface component further receives transaction information from the merchant device for the merchant during a transaction between the merchant and the user, wherein the transaction information comprises the credential, and wherein the transaction processing module matches the credential to the limited use authentication credential to determine whether to authorize the transaction. The transaction processing module may then further process the transaction information with the at least one validity term when determining whether to authorize the transaction, wherein the transaction processing module authorizes the transaction if the credential matches the limited use authentication credential and the transaction information is within one or more limits of the at least one validity term. The user may indicate the credential information to capture for transaction authorization during the transaction with the merchant, wherein the merchant uses the merchant device to capture the credential information as the credential. In other embodiments, the transaction processing module alerts at least the merchant that the user is a potential fraudster if the credential does not match the limited use authentication credential or the transaction information is not within one or more limits of the at least one validity term.

The limited use authentication credential may comprise a token having a code determined by communication device or the transaction processing module when the communication device user is vulnerable to becoming non-operational. The limited use credential may be transmitted to a wearable computing device separate from the communication device by the communication device or the transaction processing module. After, the wearable may communicate the token to the merchant device for transaction authorization, wherein the merchant device determines the authentication credential for the transaction data using the token.

Figure 5:
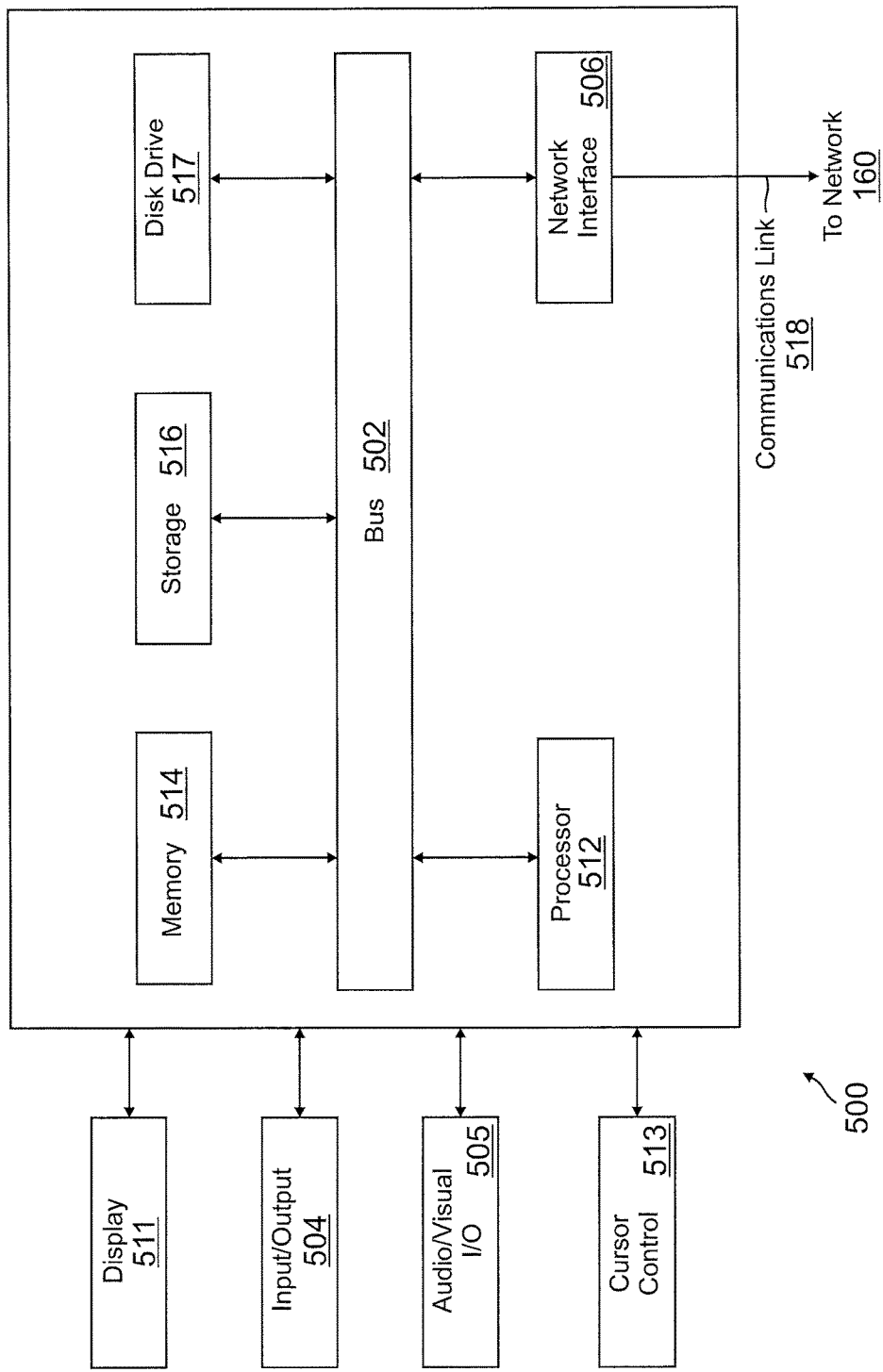
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 160. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory; and
one or more hardware processors coupled to the non-transitory memory and configured to read instructions from the non-transitory memory to cause the system to perform operations comprising:
receiving device parameters for a communication device of a user based on the device parameters triggering a non-operational credential creation process;
in response to the receiving, determining that the communication device may become non-operational based on the device parameters for the communication device;
capturing current user data for the user at a current location using an input component of the communication device;
in response to receiving the current user data, determining a limited use authentication credential for identification of the user if the communication device becomes non-operational at the current location based on the current user data;
determining a validity term for the limited use authentication credential based on the current user data;
storing the limited use authentication credential with a payment account of the user until at least one of the communication device becomes operable after non-operation or the validity term expires, wherein the limited use authentication credential is retained only by the system;
transmitting a notification identifying the limited use authentication credential to the communication device prior to the communication device becoming non-operational;
in response to receiving electronic transaction data for a transaction from a merchant device separate from the communication device, determining that the communication device has become non-operational, wherein the electronic transaction data comprises user authentication data input to the merchant device and an identifier for the payment account to process the transaction; and
determining whether to process the transaction with the payment account based on the user authentication data and the limited use authentication credential stored by the system.

2. The system of claim 1, wherein the current user data for the user comprises information for use in authorizing the transaction between a merchant associated with the merchant device and the user using the payment account of the user, and wherein the information is matched to the user authentication data in the electronic transaction data during processing of the transaction.

3. The system of claim 2, wherein the information comprises at least one of an image of the user, an image of a surrounding environment of the user, an image of the merchant, an image of a landmark, a location of the user, transportation information for the user, travel information for the user, an audio recording generated by the user, a video recording generated by the user, a current biometric of the user, or an environmental parameter.

4. The system of claim 3, wherein the input component comprises one of a communication module connected to an external device or an external sensor that captures the information, a text input device, a camera, a microphone, an accelerometer, a motion detector, an environmental sensor, or a biometric sensor.

5. The system of claim 1, wherein the device parameters comprises at least one of a power level of the communication device, a malfunctioning warning for the communication device, a signal strength for a communication signal used by the communication device, or a location of the communication device used to determine available signal towers for communication with the communication device.

6. The system of claim 5, wherein the device parameters are received with a request for the limited use authentication credential.

7. The system of claim 5, wherein the device parameters are received without user input to the communication device.

8. The system of claim 5, wherein the operations further comprise:
receiving a notice that the communication device is active after the communication device has become non-operational; and
invalidating the limited use authentication credential on a receipt of the notice.

9. The system of claim 1, wherein the validity term comprises a limit associated with at least one of the current location of the communication device, a time for the transaction, a merchant for the transaction, an item in the transaction, or a monetary amount for the transaction.

10. The system of claim 1, and wherein the determining whether to process the transaction comprises matching the user authentication data to the limited use authentication credential to determine whether to authorize the transaction.

11. The system of claim 10, wherein the determining whether to process the transaction further comprises analyzing the validity term with the electronic transaction data when determining whether to authorize the transaction, and wherein the transaction is authorized if the limited use authentication credential and the electronic transaction data is within one or more limits of the validity term.

12. The system of claim 11, wherein the user authentication data is received during the transaction from the merchant device.

13. The system of claim 10, wherein the determining whether to process the transaction further comprises matching the electronic transaction data to the validity term when determining whether to authorize the transaction, and wherein the operations further comprise alerting the merchant device that the user is a potential fraudster if the user authentication data does not match the limited use authentication credential or the electronic transaction data is not within one or more limits of the validity term.

14. A method comprising:
in response to receiving device parameters for a communication device based on the device parameters triggering a non-operational credential creation process, determining, by a transaction processing module of a service provider and comprising at least one hardware processor, that the communication device for a user may become non-operational based on the device parameters;
capturing current user data for the user at a current location using an input component of the communication device;
in response to receiving the current user data, determining, by the transaction processing module, a limited use authentication credential for identification of the user if the communication device becomes non-operational at the current location based on the current user data;

determining a validity term for the limited use authentication credential based on the current user data;

storing, by the transaction processing module in a database stored to a non-transitory memory, the limited use authentication credential with a payment account of the user until at least one of the communication device becomes operable after non-operation or the validity term expires, wherein the limited use authentication credential is retained only by the service provider;

transmitting a notification identifying the limited use authentication credential to the communication device prior to the communication device becoming non-operational;

in response to receiving electronic transaction data for a transaction from a merchant device separate from the communication device, determining that the communication device has become non-operational, wherein the electronic transaction data comprises user authentication data input to the merchant device and an identifier for the payment account to process the transaction; and determining whether to process the transaction with the payment account based on the user authentication data and the limited use authentication credential stored by the service provider.

15. The method of claim 14, wherein the device parameters comprise at least one of an available power level, a network coverage area associated with a location of the communication device, or a malfunctioning component of the communication device.

16. The method of claim 14, wherein the determining whether to process the transaction comprises:

matching the user authentication data to the limited use authentication credential;

processing the electronic transaction data with the validity term; and authorizing the transaction if the user authentication data matches the limited use authentication credential and the electronic transaction data is within one or more limits of the validity term.

17. The method of claim 16, wherein the limited use authentication credential comprises a token having a code determined by communication device or the service provider.

18. The method of claim 17, wherein the limited use authentication credential is transmitted to a wearable computing device separate from the communication device by the service provider.

19. The method of claim 18, wherein the user authentication data is provided with the electronic transaction data by the merchant device using the token via the wearable computing device.

20. A non-transitory machine-readable medium having stored thereon machine-readable instructions executable to cause a machine to perform operations comprising:

in response to receiving device parameters for a communication device by a transaction processing module of a service provider and comprising at least one hardware processor, determining that the communication device for a user may become non-operational based on the device parameters;

capturing current user data for the user at a current location using an input component of the communication device;

in response to receiving the current user data, determining, by the transaction processing module, a limited use authentication credential for identification of the user if the communication device becomes non-operational at the current location based on the current user data;

determining a validity term for the limited use authentication credential based on the current user data;

storing, by the transaction processing module in a database stored to a non-transitory memory, the limited use authentication credential with a payment account of the user until at least one of the communication device becomes operable after non-operation or the validity term expires, wherein the limited use authentication credential is retained only by the service provider;

transmitting a notification identifying the limited use authentication credential to the communication device prior to the communication device becoming non-operational;

in response to receiving electronic transaction data for a transaction from a merchant device separate from the communication device, determining that the communication device has become non-operational, wherein the electronic transaction data comprises user authentication data input to the merchant device and an identifier for the payment account to process the transaction; and determining whether to process the transaction with the payment account based on the user authentication data and the limited use authentication credential stored by the service provider.

* * * * *